United States Patent [19]

Brownell

[11] 4,428,102

[45] Jan. 31, 1984

[54] QUICK RELEASE DEVICE

[76] Inventor: David B. Brownell, 6407 Dean Dr., Woodridge, Ill. 60517

[21] Appl. No.: 366,911

[22] Filed: Apr. 9, 1982

[51] Int. Cl.³ .............................................. B64D 17/32
[52] U.S. Cl. .................................. 24/574; 244/151 B; 244/151 A
[58] Field of Search .................. 24/201 R, 202.1, 223, 24/222, 197, 230 TC, 175, 182, 183, 372, 373, 374, 265 EC, 265 R; 244/151 A, 151 B, 151 R, 152; 54/69; 119/96

[56] References Cited

U.S. PATENT DOCUMENTS

| | | | |
|---|---|---|---|
| 2,473,554 | 6/1949 | Warner | 24/201 R |
| 2,563,809 | 8/1951 | Ash | 24/197 |
| 3,121,270 | 2/1964 | Van Den Broek et al. | 24/197 |
| 3,380,692 | 4/1968 | Gaylord | 244/151 B |
| 3,934,848 | 1/1976 | Snyder | 24/201 R |
| 4,030,689 | 6/1977 | Rodriquez | 24/201 R |
| 4,262,865 | 4/1981 | Smith | 24/151 A |

FOREIGN PATENT DOCUMENTS 1172592 12/1969 United Kingdom .

*Primary Examiner*—Gene Mancene
*Assistant Examiner*—Kris R. Schulze
*Attorney, Agent, or Firm*—Leydig, Voit, Osann, Mayer & Holt, Ltd.

[57] ABSTRACT

A quick release device comprising two members which may be releasably engaged to transmit a tensile force. Each of the members has a load-connection end and an engagement end. The engagement end of the members comprises two flat, elongate branches, with each of the branches terminating in a flat, rigid paddle. The paddles of one member foldingly engage the paddles of the second member whereby the paddles fold together into an interlocking arrangement. A releasable latch holds the paddles securely in the folded position so that the members can transmit a tensile force so long as the latch is in place, and the members will disengage from one another when the latch is released, without passing through any rings, links, loops or buckles.

8 Claims, 6 Drawing Figures

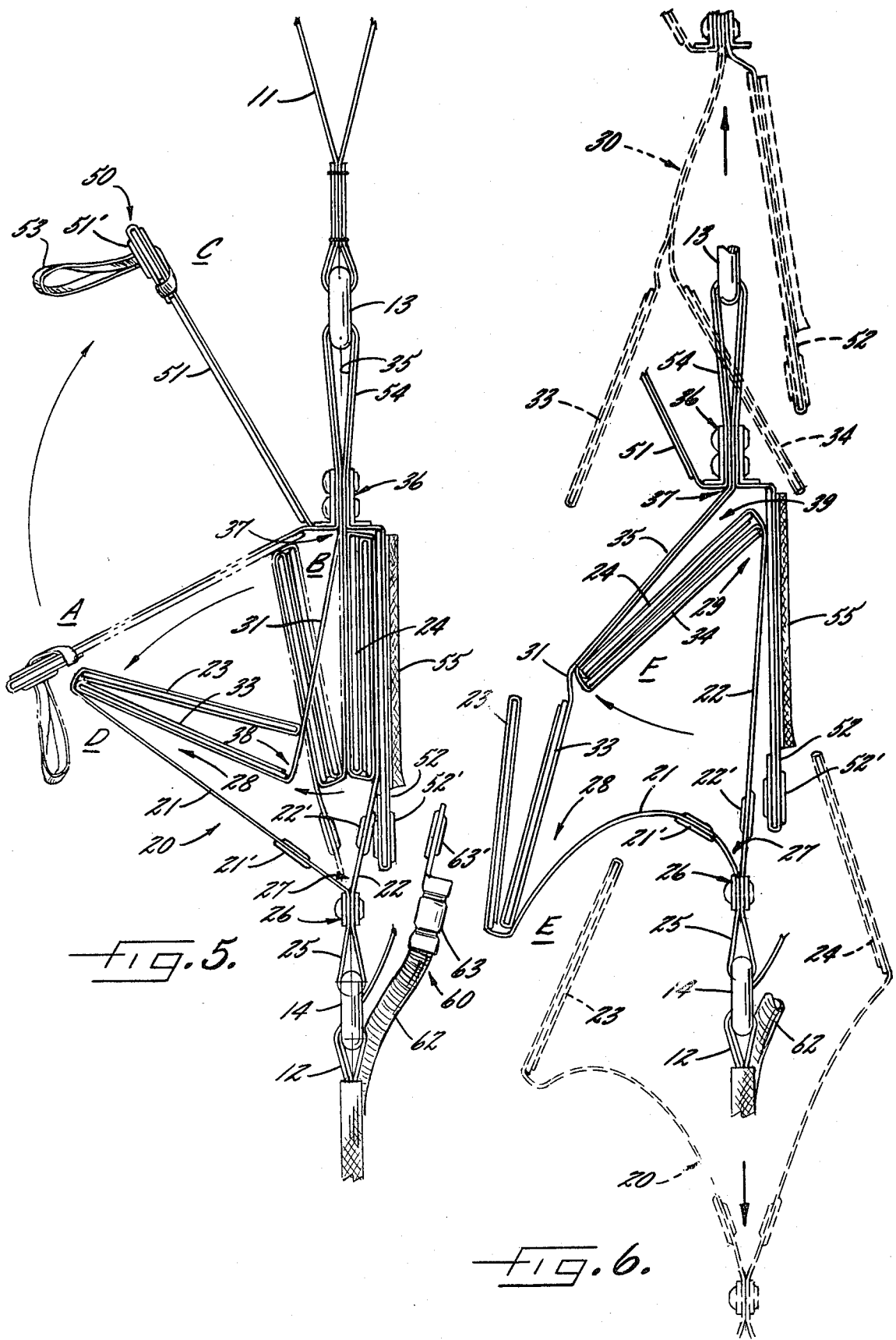

QUICK RELEASE DEVICE

BACKGROUND OF THE INVENTION

This invention relates generally to a quick release device suitable for a broad range of applications and which may be especially advantageously employed as a releasable connector for coupling parachute risers to a body harness.

It has become conventional practice in military and sport parachuting to rig the main parachute assembly with a quick release mechanism so that the main canopy can be released in case of malfunction. In such instances, it is generally necessary that the main canopy be disconnected completely from the body harness before the reserve canopy is released, otherwise the two canopies may entangle, with potentially fatal results.

Several types of parachute release mechanisms have been developed, e.g., U.S. Pat. No. 2,473,554 to Capewell, U.S. Pat. No. 3,934,848 to Snyder, and British Pat. No. 1,172,592 to Fitzgerald. In practice, the parachutist will need two such devices—one at each shoulder.

The Capewell release system basically includes a male fitting attached to the parachute riser with a heel and nose portion that fit respectively into a corresponding recess on a female fitting, beneath a sliding cover. The female fitting is in turn attached to the body harness. A latch assembly is operatively attached to the sliding cover so that when the latch assembly is disengaged, the male fitting and riser and, resultingly, the main canopy, are released and discarded.

The Snyder release buckle device comprises a laterally inserted pin assembly which engages a series of coupling loops attached to the riser straps of the main parachute assembly. When the pin assembly is withdrawn from the loops, the main canopy is released. Finally, the Fitzgerald parachute harness employs a system of straps connected to the parachute risers, which are threaded through a series of buckles and then attached to the body harness. When released, the straps pass through the buckles, thus disconnecting the main canopy from the body harness.

The above release mechanisms suffer from numerous disadvantages. They tend to be cumbersome, heavy and bulky because of the structure deemed necessary for a reliable coupling capable of being promptly but not unintentionally uncoupled, and may become entangled in the various buckles or metal parts protruding from the parachutist's chest so that the reserve canopy does not function properly. In such cases where the main canopy is not properly released, the malfunction can result in severe injury or even death.

In addition, each of the above described mechanisms is a dual point release. That is, the parachutist must actuate the two release devices connecting the risers to the body harness independently and simultaneously to disconnect the main canopy safely. In an emergency situation, when the main canopy has failed, the need to perform simultaneous but independent actuations is a serious disadvantage.

Another type of release which has been used in sport parachuting is comprised of a series of three progressively smaller rings. To effect the release the smallest ring must pass through the middle-sized ring, which in turn must pass through the largest ring. This dual step "unthreading" must occur before the risers are completely disengaged from the body harness.

Accordingly, it is an object of the present invention to provide a quick release device which is reliable and which will disengage without fouling. It is a related object of the invention to provide a release device which is useful in parachuting and is unlikely to snag the pilot chute of the reserve canopy when the reserve canopy is deployed.

It is a further object of the invention to provide a single point release mechanism which will effect the simultaneous disengagement of the two release devices which connect the main canopy risers to the body harness.

It is a further object of the invention to provide a quick release device which is lightweight and devoid of heavy metallic elements which might otherwise injure a parachutist when the device is disengaged.

It is another object of the invention to provide a release device with a latching force which is small with respect to the tensile load so that the latching means may be simple and lightly constructed.

It is yet another object of the invention to provide a release device which is thin so as not to protrude from a parachutists's chest and thus impair the deployment of the reserve canopy.

It is also an object of the invention to provide a release device which disengages the risers from the body harness without elements of either one passing through rings, links, loops or buckles of the other.

Other objects and advantages of the invention will become apparent upon reading the attached detailed description and upon reference to the drawings.

BRIEF DESCRIPTION OF THE DRAWINGS

FIGS. 5 and 6 are views of the release device showing it in successive stages of release and disengagement.

DETAILED DESCRIPTION

While the invention has been described in connection with a preferred embodiment, it will be understood that I do not intend to be limited to the particular embodiment shown but intend, on the contrary, to cover the various alternative and equivalent constructions which may be included within the spirit and scope of the appended claims.

Turning now to the drawings, there is shown in the figures a quick release device denoted generally as 10 and intended to transmit a tensile force. While the device according to the invention may be advantageously employed in virtually any application which requires a foul-free quick release of two elements in tension, the figures herein depict the invention as a main parachute release. In the embodiment shown, the release device releasably connects the main canopy riser 11 to the body harness 12 worn by a parachutist through links 13 and 14, respectively. Like the prior art mechanisms, the parachutist will need two such devices—one at each shoulder.

Each device is comprised of two members having ends which engage each other and load-connection ends that attach to the elements which are to be connected in tension. As already noted in the embodiment shown, the links 13 and 14 effect the attachment of the load-connection ends of the device 10 to the parachute rigging. It will be appreciated from the description which follows, however, that the use of links to interface between the release device and the elements to be releasably subjected to tension is only one possible arrangement. For example, the elements of the release device might simply be formed as integral, terminal ends of the elements, i.e., the main canopy riser 11 and the body harness 12 in the parachute rigging shown.

Figure 1:
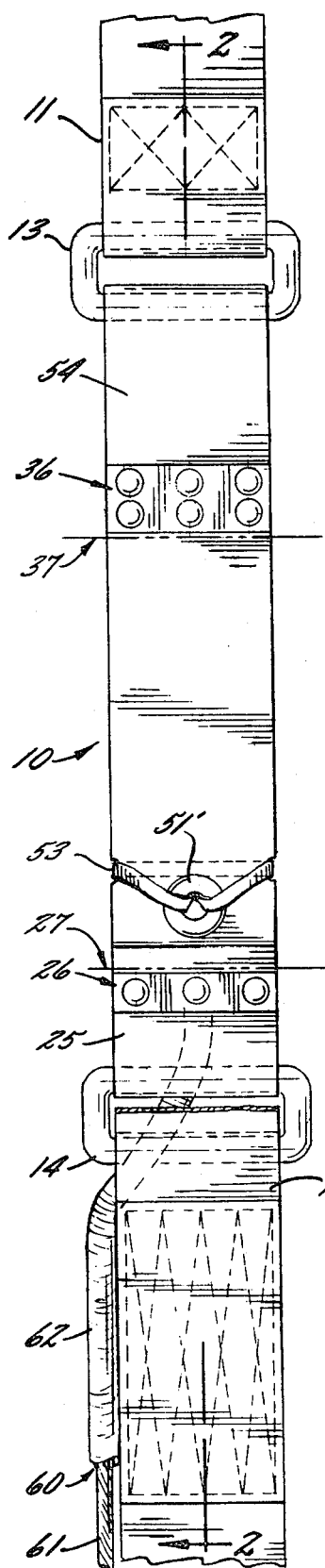
FIG. 1 is a plan view of the front of the release device according to the invention in the closed and latched condition.
Figure 2:
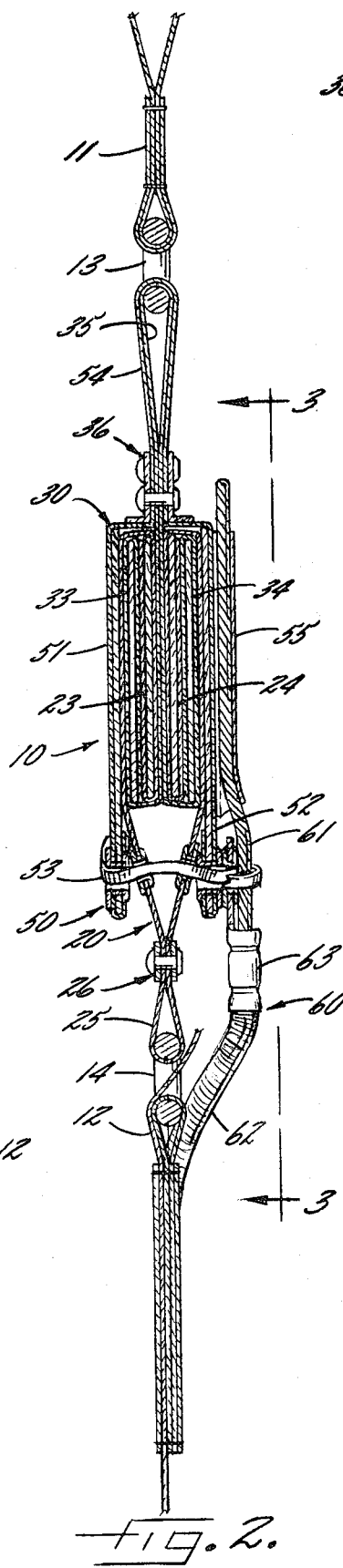
FIG. 2 is a sectional view taken along line 2—2 of FIG. 1.
Figure 3:
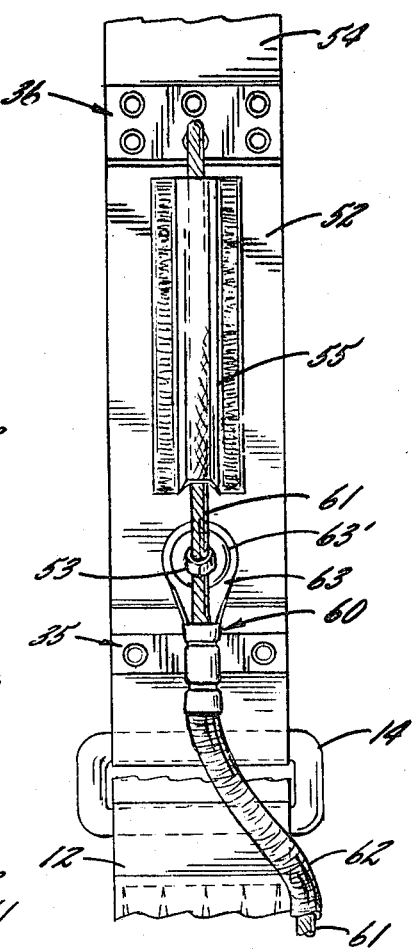
FIG. 3 is a plan view of the rear of the release device showing the latch assembly in the latched condition taken along line 3—3 of FIG. 2.

In accordance with the present invention the engagement ends of the release device members fold together into an interlocking arrangement shown in the sectional view of FIG. 2 and, as shown in FIGS. 5 and 6, will disengage from one another without passing through any rings, links, loops or buckles. More specifically, the engagement end of each of the members of the release device consists of two branches. While the specific point at which the branches begin may be selected with a certain degree of latitude, it is helpful in the description which follows to identify as a reference point the "fork" at which the branches originate. Hence, the line transverse to the branches along which the branches separate in aligned face-to-face relationship shall be termed the separation line. Each of the branches terminates in a rigid paddle. The paddles of one member are foldable inwardly towards the separation line to form open-sided, U-shaped pockets to receive the paddles of the second member. The paddles of the second member are foldable outwardly away from the separation line to form a second pair of open-sided, U-shaped pockets to receive the paddles of the first member. A releasable latch holds the paddles securely in the fold position.

In the embodiment shown, as best seen at various stages of release in FIGS. 5 and 6, the member 20 of the release device 10 comprises two flat, elongate branches 21, 22, which terminate in flat, rigid paddles 23, 24. The branches 21, 22 of the member 20 are formed of a single piece of webbing 25 which wraps around the link 14. It is contemplated that the webbing be thin, flexible, and have a suitably high tensile strength to provide a comfortable safety factor in terms of the maximum tensile loading expected. Nylon webbing and a webbing marketed by duPont under the tradename Kevlar are examples of materials which might be used. The paddles 23, 24 may be formed by affixing stiff, flat plates to the ends of the webbing. This can be accomplished in a variety of ways, including sewing or gluing the plates directly to the webbing, or forming a pocket at the end of the webbing into which the plates can be inserted and secured. Cyanoacrylate adhesive is thought to offer the advantages of ease in assembly coupled with a very secure bond on a variety of materials. One suitable material for the paddles is steel. Depending upon the sizes and expected loading, however, a variety of other materials might be employed.

A short distance from the link 14 there is provided a confluence 26 which prevents the shifting of the paddles 23, 24 relative to one another and defines the separation line 27 of the branches 21, 22. As shown, the confluence 26 is formed by two metal plates on opposite sides of the webbing 25 secured to one another by rivets passing through the webbing.

It will be appreciated from the figures that the paddles 23 and 24 of the member 20 are foldable inwardly towards the separation line 27 of the branches 21, 22 into an aligned, substantially parallel relationship to form a first pair of open-sided, U-shaped pockets 28, 29 with the outwardly adjacent portions of the branches of this member 20 to receive a similar pair of paddles of the second member 30, described below.

The member 30 is similar in construction to the member 20. Two branches 31, 32 formed from a single piece of webbing 35 wrapped around link 13 which terminates in paddles 33, 34. A confluence 36 secures the webbing against shifting. As shown in the figures, paddles 33, 34 of the second member 30 are foldable outwardly such that the webbing may optionally be secured together, as by sewing, for a distance beyond the confluence 36. The point at which such securing together ends results in the separation line 37. The outward folding of the branches 31, 32 into an aligned substantially parallel relationship forms a pair of open-sided, U-shaped pockets 38, 39 with the inwardly adjacent portions of the branches of this member 30 to receive the paddles of the first member 20.

According to the invention, a releasable latching means is provided to hold the paddles securely in the folded position, as shown in FIG. 2. The release device 10 is capable of transmitting a tensile force so long as the latching means is in place. While one skilled in the art will appreciate that any of a variety of arrangements might be employed, one type of latching means considered to be particularly advantageous is shown in the figures as item 50. The latching means 50 shown comprises two rigid panels 51 and 52 which are hingedly mounted to the member 30 and which in the latched condition, overlie the folded outermost portions of the branches 21, 22 of the release device and maintain the paddles 23, 24 and 33, 34 in the engaged, folded condition illustrated in FIG. 2. The maintenance of the paddles in the folded condition with the latching panels is accomplished by means of a closing loop 53 which releasably secures the free, lower ends of the panels 51 and 52 together.

As best illustrated in FIG. 2, the panels 51 and 52 are formed at the opposite ends of a continuous piece of webbing 54 which overlies the webbing 35 forming the element 30 in passing through the confluence 36 and the link 13. As in the construction of the paddles 23, 24 and 33, 34, the panels 51, 52 may be formed using a flat, stiff plate secured to the webbing 54. The panels 51 and 52 are shown extending downward beyond the folded cluster of panels to permit the closing loop 53 to pass from the latching panel 51 through the branches 21 and 22, and through the other latching panel 52. Locking means shown herein as a release cable subassembly 60 activated by the main parachute release actuator (not shown) is provided to releasably engage the closing loop 53 to hold it, and consequently, the remainder of the release device, securely in the latched condition until the actuator is triggered.

Figure 4:
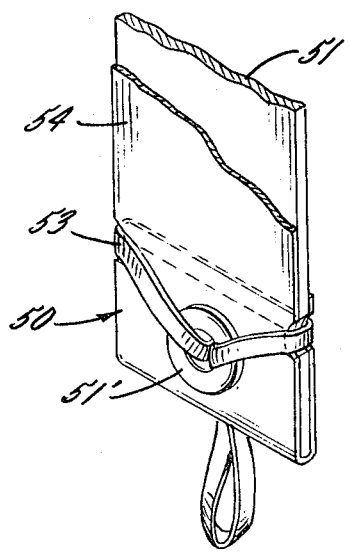
FIG. 4 is a fragmentary perspective view of the front cover panel of the release device.

In a preferred form of the latching means 50, each branch 21, 22 of the first member 20 has an opening through which the closing loop 53 passes. The openings are preferably provided with grommets 21', 22' to provide a smooth surface for the closing loop 53 to pass through. Similarly, the cover panels 51, 52 have grommets 51', 52', respectively, generally in alignment with the grommets 21' and 22'. The closing loop 53 may be simply and conveniently anchored to the front cover panel 51 as shown in FIG. 4.

The release cable subassembly 60 comprises a cable 61 which is axially slidable within a flexible sheath 62 which terminates in a lug 63 with a grommet 63' therein. With the release device in the latched condition as shown in FIG. 2, the closing loop 53, after emerging from the eyelet 52' of panel 52 passes through the grommet 63'. The cable 61 extends out of the sheath 62, through the closing loop 53 and into a pocket 55 attached to the outer surface of the panel 52. This arrangement guarantees that the release device 10 will remain securely in the latched condition as shown in FIG. 2 until the cable 61 is withdrawn into the sheath 62, releasing the closing loop 53. Additionally, this arrangement permits the cables of the two devices needed to connect the main canopy risers to the body harness to be coupled so as to assure a simultaneous release.

The release operation of the device according to the invention will now be described. Simply stated, when the cable 61 is withdrawn, the members 20 and 30 are permitted to unfold and disengage from one another. FIGS. 5 and 6 illustrate an asymmetrical disengagement and demonstrate how the release device would disengage when held firmly against a parachutist's body, assumed to be on the right. One skilled in the art, however, will appreciate that absent an assymetrical restraining force the release device can disengage symmetrically about an axis defined by the center line of the folded paddles.

In FIG. 5, the phantom lines show the release device in the initial stages of disengagement. First, the cover panel 51 is pushed to position A by the paddles 23, 33 unfolding at position B. The cover panel 51 then moves to the position shown in solid lines at C, aided in part by the upward flow of air as the parachutist descends, while the paddles 23, 33 unfold as shown in solid lines at D. The solid lines of FIG. 6 show the members 20 and 30 as the paddles 23, 33 continue to disengage at position E, with paddles 24, 34 disengaging at position F. The phantom lines in FIG. 6 show the members 20, 30 completely disengaged and separating in the direction of the arrows.

I claim as my invention:

1. A quick release device comprising two members which may be releasably engaged to transmit a tensile force, each of the members having a load-connection end and an engagement end, the engagement end of each of the members comprising two flat, flexible elongated branches, the branches of each member originating in aligned, face-to-face relationship with each of the branches terminating in a flat, rigid paddle, the paddles of one member being foldable relative to the adjacent portions of their branches toward one another through an arc of substantially 180° to form inwardly-directed U-shaped pockets to receive the paddles of the second member, the paddles of the second member being foldable relative to the adjacent portions of their branches away from one another through an arc of substantially 180° to form outwardly-directed U-shaped pockets to receive the paddles of said one member, and releasable latching means for holding the paddles securely in their substantially 180° folded positions whereby the members are capable of transmitting a tensile force therethrough so long as the latching means is in place and the members will freely disengage from one another when the latching means is released.

2. The release device as claimed in claim 1 wherein the branches are comprised of webbing and the paddles are formed by affixing stiff, flat plates to the ends of the webbing.

3. The release device as claimed in claim 2 wherein the plates are affixed to the ends of the webbing with adhesives.

4. The release device as claimed in claim 1 wherein the branches of each member are comprised of a single piece of webbing which forms a loop at the load-connection end of its member.

5. The release device as claimed in claim 1 wherein the latching means comprises two cover panels hingedly mounted to the second member to overlie the folded paddles and means to releasably hold the cover panels together, thereby maintaining the paddles of the members in their folded positions.

6. The release device as claimed in claim 5 wherein each branch of said one member has an opening therein, the openings being in positional alignment, at least one cover panel having an opening in alignment with the openings in the members, the releasable holding means comprising a closing loop anchored to one cover panel, the closing loop being threadable through the opening in the the members and the other cover panel, and locking means engageable through the closing loop on the outboard side of the other cover panel to hold the cover panels together so long as the locking means is engaged.

7. The release device as claimed in claim 6 wherein the locking means comprises a cable and means connected to the cable for withdrawing the same from the closing loop.

8. The release device as claimed in claim 6 wherein the locking means comprises a sheath, a cable axially slidable therein for engaging the closing loop, means connected to the cable for withdrawing the same from the closing loop.

* * * * *